UNITED STATES PATENT OFFICE.

TURNER D. BOTTOME, OF HOOSICK, NEW YORK, ASSIGNOR TO JOHN B. TIBBITS, OF SAME PLACE.

INSULATING COMPOSITION.

SPECIFICATION forming part of Letters Patent No. 439,796, dated November 4, 1890.

Application filed January 2, 1890. Serial No. 335,731. (No specimens.)

*To all whom it may concern:*

Be it known that I, TURNER D. BOTTOME, a citizen of the United States, and a resident of Hoosick, in the county of Rensselaer and State of New York, have invented certain new and useful Improvements in Insulating Compositions, of which the following is a specification.

This invention relates to an insulating composition for electrical purposes, such as may be used in the manufacture of various articles for use with electrical apparatus, among which may be mentioned holders and caps for incandescent electric lamps, washers, tubes, &c., for insulating uses around electrical conductors and connections.

Heretofore compositions of a similar kind have been made by mixing powdered substances of refractory nature with binding agents, such as the soluble silicates of sodium and potassium; but articles made from such masses never have high electrical insulating properties, owing to the fact that the alkali contained in such articles is always more or less hygroscopic, and therefore absorbs water. Hence, water being an electrical conductor, it is thus readily seen that articles made from such a mass would be entirely unsuitable for the purpose of electric insulation.

The objects of this invention are to produce a cheap and easily-manipulated mass from which to make electrical insulators that contains no alkali or other hygroscopic substance that will absorb and retain dampness, and one that will withstand all the usual disintegrating influences that ordinarily occur to insulators of this class, among which are sudden changes of temperature, mechanical strains, dampness, &c.

Briefly, the invention consists of a moldable plastic mass composed of a finely-powdered silicon dioxide mixed into a stiff paste with a solution of orthosilicic acid, ($H_4SiO_4$,) from which articles for electrical insulating purposes are molded or pressed.

In the manufacture of articles made from this composition I prefer to proceed as follows: A certain quantity of powdered silicon dioxide is placed in a suitable mixing-vessel, together with enough of about a ten-per-cent. solution in water of orthosilicic acid to make a stiff doughy mixture. Portions of the mixture so prepared are placed in molds and pressed or otherwise shaped by suitable mechanical apparatus into such articles as may be desired. The said articles are then put in a warm place and allowed to dry or become thoroughly "set." They are then subjected to a red heat, so that all volatile matter will be completely driven off. The orthosilicic acid that was used to make a mass with the silicon dioxide is thus decomposed and results in a homogeneous and coherent mass composed solely of silicon dioxide. For certain purposes metals may be embedded in the mass while it is yet plastic; then dried and baked therein.

I do not limit myself to any particular quantity of either of the ingredients used nor to the strength of the solution of the orthosilicic acid in compounding the mixture.

What I claim as my invention is as follows:

A composition for making molded or pressed electrical insulators, consisting of a solution of orthosilicic acid and silicon dioxide incorporated together, substantially as described.

Signed at Hoosick, in the county of Rensselaer and State of New York, this 31st day of December, A. D. 1889.

TURNER D. BOTTOME.

Witnesses:
GEO. H. MYERS,
D. V. JONES.